March 26, 1963  R. C. EVANS ETAL  3,082,691
ELECTRIC BRIDGE
Filed Dec. 3, 1959  3 Sheets-Sheet 1
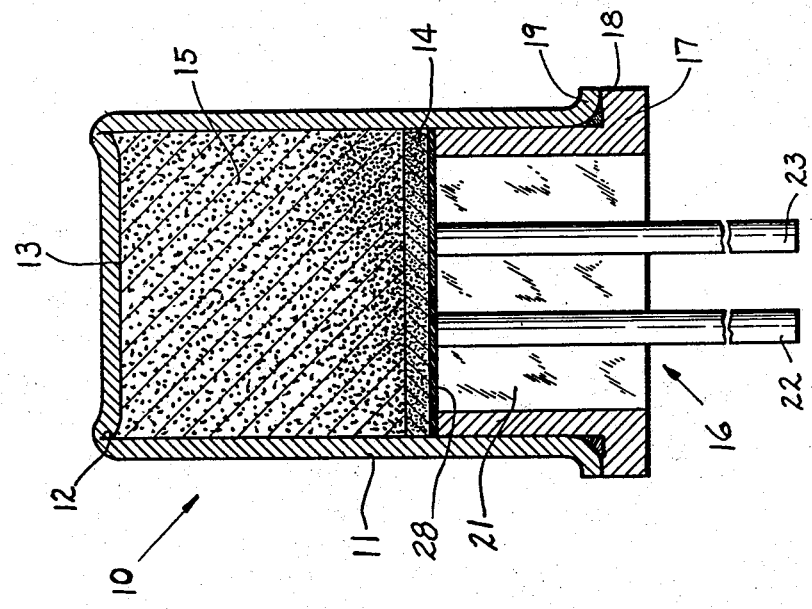
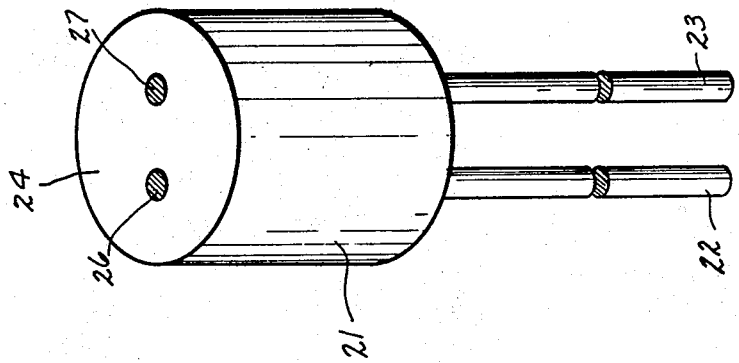
INVENTORS
RICHARD C. EVANS
FRANKLYN E. STEVENS JR.
RAYMOND I. COWLES March 26, 1963     R. C. EVANS ETAL     3,082,691
ELECTRIC BRIDGE Filed Dec. 3, 1959     3 Sheets-Sheet 3

*INVENTORS*
RICHARD C. EVANS
FRANKLYN E. STEVENS Jr
RAYMOND I. COWLES
BY

United States Patent Office 3,082,691
Patented Mar. 26, 1963

3,082,691
ELECTRIC BRIDGE
Richard C. Evans, Hamden, Franklyn E. Stevens, Jr., Wallingford, and Raymond I. Cowles, Cheshire, Conn., assignors to Olin Mathieson Chemical Corporation, a corporation of Virginia
Filed Dec. 3, 1959, Ser. No. 857,135
2 Claims. (Cl. 102—28)

This invention relates to electric igniters and detonators and in particular the invention relates to a novel bridge structure including a novel method of making a bridge.

As is well known, prior art detonator bridges fall into two general classes, the suspended wire type of which U.S. Patent 2,801,585 is typical, and the carbon film type of which U.S. Patent No. 2,762,302 is representative.

The wire type is fragile and is troublesome especially whenever one undertakes to pack a powder charge about the wire without damage.

Carbon bridges are unstable electrically, fragile and are frequently damaged by abrasion.

Accordingly, it is a primary feature of the present invention to provide a rugged electric bridge structure.

It is a further feature of the invention to provide a bridge structure which lends itself readily to modern mass production methods.

It is a still further feature of the invention to provide an electric bridge which may be tested repeatedly before assembly without destroying the efficiency of the bridge.

It is a further feature of the invention to provide an electric bridge device which operates to produce a spark as against the glow produced by a resistance wire.

A further feature of the invention is the provision of a novel process for fabricating an electric bridge.

It is a further feature of the invention to provide an electric igniter having a novel bridge structure in combination therewith where the combination will withstand temperatures as high as 700° F. for intervals as long as one hour without impairment.

A bridge device embracing certain principles of the present invention may comprise a pair of spaced electrical conductors molded within a plastic, glass or ceramic plug, said conductors intersecting at least one plane surface of said plug, said conductors being so disposed with respect to said surface that the end faces of the conductors and the said surface are coplanar, said plane surface including said end faces being coated with a thin skin of manganese or of a manganese alloy.

A process embracing certain principles of the invention may comprise the steps of molding a pair of spaced, elongated, electrical conductors within a plug of plastic, glass or ceramic material, machining a plane surface upon the plug to expose portions of each conductor, selecting said plane surface relative to the body of the plug so that the exposed portions of the conductors define plane areas which are positioned generally transverse to a longitudinal axis of each conductor and further positioning said plane surface relative to said plane areas so that the plane surface and the plane area are coplanar.

Other features and advantages of the present invention will become more apparent from the succeeding specification when read in conjunction with the appended drawings in which:

FIG. 1 is a vertical section of an electric squib with which the electric bridge of the present invention may be associated.

FIG. 2 is a perspective view of an electric bridge similar to the one illustrated in FIG. 1 having a flush face.

Figure 3:
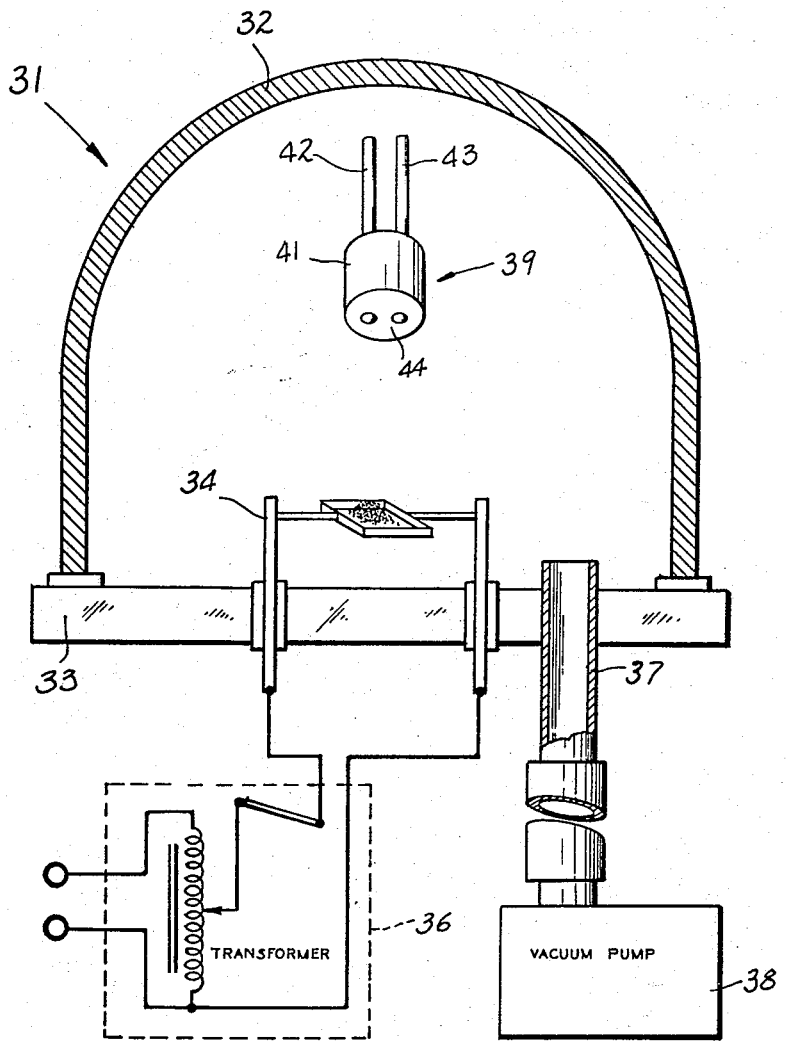
FIG. 3 is a schematic illustration of an apparatus operable to deposit manganese or manganese alloys upon a plug.

Referring to FIG. 1, the reference numeral 10 identifies an electric squib with which the electric bridge of the present invention is utilized and comprises a metallic housing 11 formed with a coined bottom. The coining 12 weakens bottom 13 so that it will blow out when the squib is fired.

Deposited within the housing 11 is a powder charge 15 comprising a metal and an inorganic oxidizing agent which in the disclosed squib is a mixture of barium chromate and magnesium. On the lower side, the powder charge is bounded by a layer of igniter powder 14 such as a mixture of zirconium and barium chromate.

Immediately below the igniter powder is an electric bridge device, embracing the principles of the present invention, indicated generally by the reference numeral 16 and comprising a steel casing 17 of generally cylindrical contour received in telescopic fashion within the housing 11. Mating flanges 18 and 19 formed on the steel casing 17 and the metal housing 11, respectively, are fastened together around the full circumference of the flanges to effect a fluid tight seal by any appropriate means such as by projection welding.

The electric bridge device, per se, generally referenced by numeral 16 comprises a glass body or plug 21 in which a pair of spaced longitudinally disposed electrical conductors 22 and 23 are molded. As is shown in FIG. 2, the end face 24 of the glass plug 21 and the end faces 26 and 27 of the conductors 22 and 23 are all disposed coplanar with one another.

As will become more apparent hereinafter, the plane surface formed on the plug of FIGS. 1 and 2 is accomplished by machining or grinding a selected surface of the plug until a generally transverse section of each conductor is exposed so that the exposed section is coplanar with the face of the plug.

The face of the plug, so machined, is coated with thin skin or film of manganese or of a manganese alloy 28.

In the squib device so coated an electrical potential applied across conductors 22 and 23 is operative to energize the manganese film in turn operative to produce a spark effective to energize igniter powder 14. The igniter powder burns vigorously to activate the main powder charge 15 disposed in the upper portion of the casing 11.

Referring now to FIG. 3 there is shown a bell jar assembly, indicated generally by the reference numeral 31, comprising a bell 32 making a fluid tight connection with base member 33 in which there is supported a molybdenum boat 34 powered by transformer 36 in well known fashion. The base member 33 also contains a fitting 37 leading to a vacuum pump 38 operable to evacuate the bell portion of the apparatus. A partially fabricated electric bridge, indicated generally by the reference numeral 39 and comprising a glass body or plug 41 within which there is molded a pair of space conductors 42 and 43, is suspended within the bell over the molybdenum boat 34.

As stated previously, the lower face 44 of the plug is ground so that the end faces of the conductors 42 and 43 are disposed flush with the end face of the plug. With a quantity of manganese or a manganese alloy disposed within the molybdenum boat energization of the molybdenum boat and evacuation of the bell jar is operable in well known fashion to bring about the deposition of manganese or one of its alloys, as the case may be, upon the face of the plug 41. The process is often referred to as vacuum deposition thus we may refer to the electric bridge so fabricated as an "evaporated bridge."

Obviously, the thickness of the coating applied on skin can be controlled by selecting exposure time, quantity of metal and source temperature judiciously.

Figure 6:
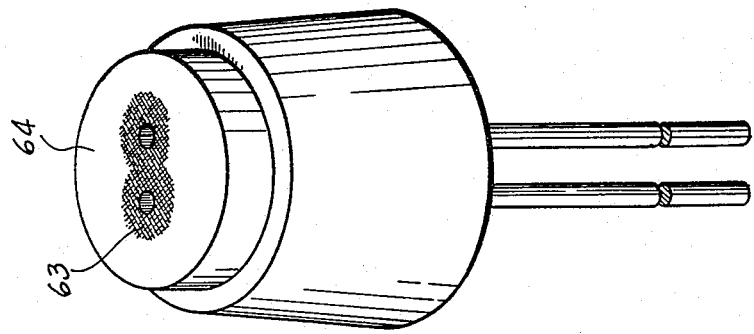
FIGS. 4, 5 and 6 are perspective views of various electric bridges differing primarily in their face contours and fabricated in accordance with the principles of the present invention.
Figure 5:
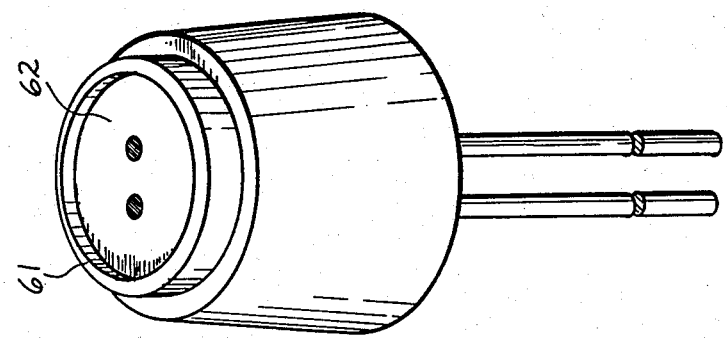
Figure 4:
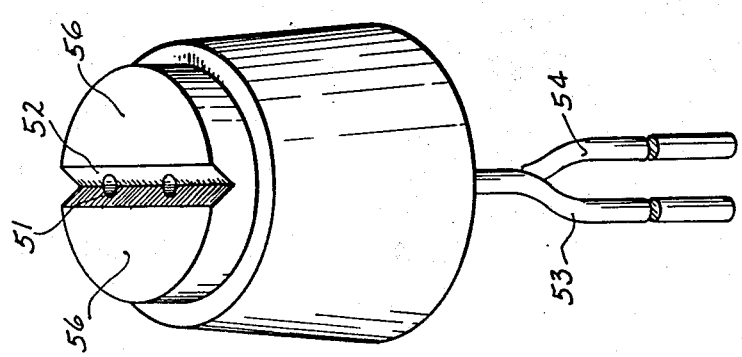

Referring now to FIGS. 4, 5 and 6, it is apparent that the electric plug may be formed with various contours on the face thereof effective to give greater protection to the manganese skin or to provide means for varying the amount of skin.

FIG. 4 shows a plug body wherein the face has been formed generally with a V-shaped groove defined by two intersecting surfaces 51 and 52. Each surface defines a plane embracing at least a portion of a generally transverse section of each electrical conductor 53 and 54. Although the deposition of manganese occurs on the plane surface, referenced 56, as well as upon the surfaces 51 and 52, subsequently the surface 56 is ground operative to remove the manganese skin from this surface thereby affording a scheme for varying the amount of skin remaining in the groove. Stated otherwise, after the surface 56 is ground free of manganese, more or less grinding will be effective to reduce the manganese deposited on the surfaces 51 and 52.

The plug shown in FIG. 5 is formed with a projected skirt 61 which operates as a protective barrier for the manganese skin, referenced 62.

Obviously this arrangement does not interfere with vacuum deposition but does afford protection during the course of material handling prior to assembly.

FIG. 6 shows an arrangement in which the hatched area, referenced 63, represents manganese skin deposited while the plane area 64 defines a surface from which the skin has been scratched or shaved to produce the desired amount of coating in the desired conformation to satisfy predetermined electrical characteristics.

It is to be noted that in utilizing the term "manganese" in the above specification and the succeeding claims, it is intended that alloys of manganese be included.

Among the advantages of the electric igniter embracing the disclosed structure and fabricated in accordance with the disclosed process, are the following:

(1) The electric bridge of the present invention can be pressed rigidly against an already loaded powder charge without destroying the bridge. This permits the powder charge to be compacted properly in the case before insertion of the bridge and the whole structure can be massed together in final assembly leaving no space between the face of the bridge and the powder for shifting under vibration and shock. This method of assembly permits electric welding of bridge plug to case, since the welded seam is not contiguous to the powder itself.

(2) The bridge may extend across the face of the plug to the case and make electrical contact with the case without impairing its function. This structure permits electric charges which develop from static, friction, or radio signals to leak off harmlessly, thereby making a safer igniter.

(3) The detonator arrangement is more readily adaptable to man production because of the rugged structure of the bridge.

In devising electric bridge devices in accordance with the principles of the present invention it has been found that the skin thickness deposited upon the plug may range from one-half thousandths of an inch to ten thousandths of an inch depending upon the electrical properties desired.

It is anticipated that a wide variety of improvements and modifications of the disclosed apparatus may be devised without departing from the spirit and scope of the invention.

What is claimed is:

1. In combination an electric igniter including an electric bridge comprising a main housing having a coined bottom, a powder charge disposed in the housing adjacent the bottom, a secondary housing encasing an electric bridge received in telescoping fashion within the main housing, said electric bridge including a pair of spaced electrical conductors molded into a plug, one surface of said plug defining a plane which intersects both said conductors so as to embrace generally transverse sections of said conductors, said plane surface being coated with a skin of manganese, and cooperating flange means formed on both housings operative to retain the plug firmly within the main housing so that the surface thereof is effective to press upon the powder charge without destroying the structure of the bridge.

2. A bridge device comprising a pair of spaced electrical conductors molded within a plug of insulating material, said insulating material being selected from the group consisting of plastic, glass and ceramic material, said plug having a flat face intersected by two surfaces defining a V-shaped groove in said flat face, an end face of each conductor terminating in said V-shaped groove, a portion of each said end face and a portion of said surfaces being coplanar, said surfaces and said end faces being coated with a thin skin of manganese, said V-shaped groove being operative to protect the skin of manganese from scuffing.

References Cited in the file of this patent

UNITED STATES PATENTS

| | | |
|---|---|---|
| 2,708,877 | Smits | May 24, 1955 |
| 2,722,155 | Pauls | Nov. 1, 1955 |
| 2,754,757 | MacLeod | July 17, 1956 |
| 2,881,703 | Volpert | Apr. 14, 1959 |
| 2,920,569 | Menke | Jan. 12, 1960 |
| 2,924,140 | Scherrer | Feb. 9, 1960 |
| 2,974,591 | Pasternack | Mar. 14, 1961 |